June 27, 1939.　　　J. W. FRENCH　　　2,164,107
RANGE FINDER AND LIKE OPTICAL MEASURING INSTRUMENT
Filed Dec. 30, 1937
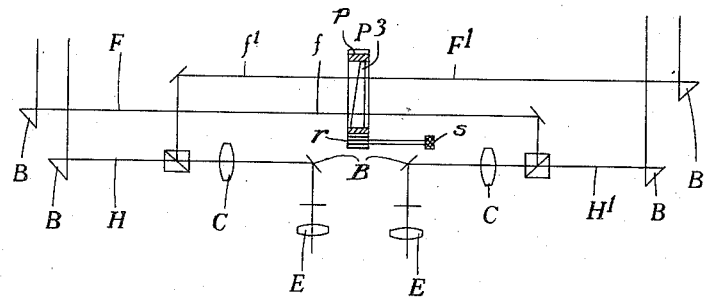
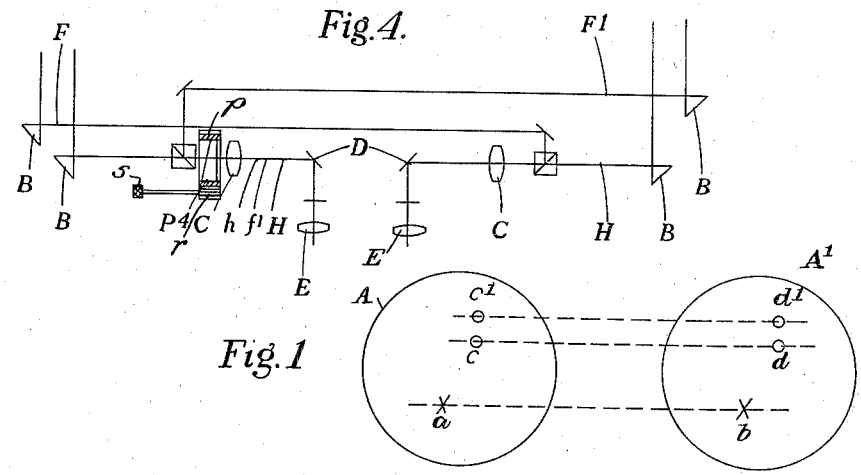
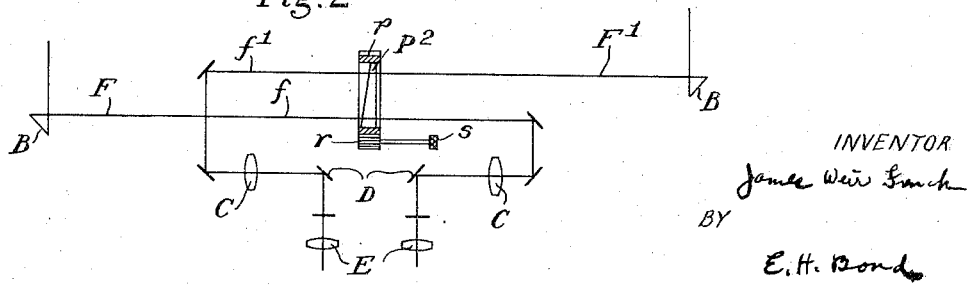
INVENTOR
James Weir French
BY
E. H. Bond
ATTORNEY Patented June 27, 1939

2,164,107

UNITED STATES PATENT OFFICE 2,164,107

RANGEFINDER AND LIKE OPTICAL MEASURING INSTRUMENT

James Weir French, Anniesland, Glasgow, Scotland, assignor to Barr and Stroud, Limited, Glasgow, Scotland Application December 30, 1937, Serial No. 182,613
In Great Britain January 14, 1937

4 Claims. (Cl. 88—2.7)

This invention refers to rangefinders and like optical measuring instruments operating on the stereoscopic principle, for example, stereoscopic rangefinders, with reference to which the invention will be described.

In a stereoscopic rangefinder two images of the object under observation are fused stereoscopically by the eyes of the observer and compared with a reference mark which is itself formed by stereoscopic fusion, usually by fusion of two reference marks within the instrument but sometimes by fusion of a second pair of images of the object as shown, for example, in the specification of British Patent No. 325,956 granted to Barr and Stroud, Limited, James Weir French.

Stereoscopic rangefinders are known in which measurement of range is effected by means of a pair of prisms placed near to one another in the beam of light which forms one image of the object, these prisms in the operation of rangefinding being simultaneously turned about the axis of that beam in opposite directions and in more or less parallel planes. The process of effecting stereoscopic fusion involves bringing the two images of the object together transversely and also bringing the reference mark images together transversely, and a general condition is that the two images of the object should lie on a line which is parallel with the line of the reference mark images, any divergence of these lines making fusion difficult. Using a pair of prisms such as referred to, while the deviating effects of the prisms in the plane of measurement (hereinafter assumed to be horizontal) are additive, the deviating effects vertically are subtractive so that there is no vertical movement of either image as the prisms are turned and the condition of parallelism is maintained. As an alternative to the use of a pair of prisms in the beam of light which forms one image of the object, there may be two angularly movable measuring prisms, one in each of the two beams, see the specification of United States Patent No. 1,019,412, issued to Barr and Stroud, Limited. In such an arrangement, equal angular movement of the prisms in the same sense, causes each of the two images to move vertically in its field by the same amount so that the condition of parallelism is maintained.

The present invention is concerned with rangefinders having a pseudo-stereoscopic optical system, its object being to provide such instrument with an improved measuring prism arrangement of angularly movable character.

According to this invention in an instrument having a pseudo-stereoscopic optical system, one and the same angularly movable measuring prism is arranged to serve two beams of light, being placed in the beams at a position where the beams proceed side by side and being movable angularly therein, the two corresponding images of the object being moved vertically by the same amount so that the condition of parallelism is maintained. In the case of an ortho-pseudo-stereoscopic system, one and the same angularly movable measuring prism may be arranged to serve two beams, one a beam belonging to the ortho-stereoscopic part of the system and the other a beam belonging to the pseudo-stereoscopic part of the system and forming images in the same field, the prism being placed in these beams at a position where they proceed side by side or the measuring prism may be placed in the two pseudo-stereoscopic beams. In the former case the ortho-image and the pseudo-image in the same field are moved vertically by the same amount while the images in the other field are not moved vertically, the condition of parallelism being maintained, while in the latter case, the two pseudo-images, one in each field, are moved vertically by the same amount.

Some examples of rangefinders in accordance with the invention will now be described with reference to the accompanying drawing, in which:

Figure 1 is a diagram showing the two fields of view of a stereoscopic optical system.

Figures 2, 3 and 4 show diagrammatically a simple pseudo-stereoscopic rangefinder, and two examples of an ortho-pseudo-stereoscopic rangefinder, respectively, in accordance with the invention, and Figure 5 is a diagram of the fields of view explaining Figure 4.

Referring to Figure 1, in each of the fields of view A, $A^1$ there appears a reference image $a$, $b$ and an image $c$, $d$ of the object. The lines $a$—$b$ and $c$—$d$ should be parallel and should remain so throughout the operation of the instrument, the image $a$ being fused with the image $b$ and the image $c$ with the image $d$. In instruments of the known kind comprising a pair of angularly movable measuring prisms in the same beam the position of the lines $a$—$b$ and $c$—$d$ does not alter.

Figure 2 shows a pseudo-stereoscopic rangefinder system for use with internal reference marks, the portions $f$ and $f^1$ of the beams F and $F^1$ from the left and right hand ends of the base, respectively, being side by side, enabling one angularly movable measuring prism $P^2$ to serve both beams. The prism P² is mounted on a carrier $p$ which is rotatable by means of a pinion wheel $r$ operated from a head $s$. As a result of rotational movement of the prism P² each of the images $c$ $d$, see Figure 1, is moved in the measuring plane and also vertically to the positions $c'$ $d'$, but the vertical movement is in each case the same so that the line $c'$—$d'$ remains parallel to $a$—$b$.

Figure 3 is similar to Figure 2 except that in addition to the pseudo-stereoscopic system F, F¹, there is an ortho-stereoscopic system H, H¹ to form a second pair of images of the object to serve as reference marks, a single angularly movable measuring prism P³ being placed in the parallel portions $f$, $f^1$ of the pseudo-stereoscopic beams F and F¹.

The instrument illustrated in Figure 4 is an ortho-pseudo-stereoscopic instrument similar to that shown in Figure 5, but in this case a single angularly movable measuring prism P⁴ is placed in the parallel portions $f^1$, $h$ of the right hand pseudo-stereoscopic beam F¹ and the left hand ortho-stereoscopic beam H, the portions $f^1$ and $h$ being one above the other in Figure 4. As shown in Figure 5, angular movement of the prism P⁴ causes vertical movement of the reference image $a$ and the image $c$ in the field A to the positions $a^1$ and $c^1$, but these vertical movements are of the same magnitude, and the lines $a^1$—$b$ and $c^1$—$d$ are parallel.

I claim:

1. A rangefinder or like optical measuring instrument operating on the stereoscopic principle, including optical means for forming a pseudo-stereoscopic pair of image-producing beams of light within the instrument, and comprising prism moving means and one, and only one, measuring prism to serve two beams of light, being placed in the paths of the two beams at a position where they proceed side by side and being movable angularly therein by actuation from said prism moving means, for effecting range measurement, involving equal vertical movements of the two associated images, each in its field.

2. A rangefinder or like optical measuring instrument operating on the stereoscopic principle, including optical means for forming a pseudo-stereoscopic pair of image-producing beams of light and reference marks within the instrument for forming reference images in the fields of view, and comprising prism moving means and one, and only one, measuring prism serving both the pseudo-stereoscopic beams, being placed in the paths of the two beams at a position where they proceed side by side and being movable angularly therein by actuation from said prism moving means, for effecting range measurement, involving equal vertical movements of the two associated images, one in each field.

3. A rangefinder or like optical measuring instrument operating on the stereoscopic principle, including optical means for forming a pseudo-stereoscopic pair of image-producing beams of light within the instrument, and comprising prism moving means and one, and only one, measuring prism serving both of the pseudo-stereoscopic beams, being placed in the paths of the two beams at a position where they proceed side by side and being movable angularly therein by actuation from said prism moving means, for effecting range measurement, involving equal vertical movements of the two associated images, one in each field of view.

4. A rangefinder or like optical instrument operating on the stereoscopic principle, including optical means for forming an ortho-stereoscopic pair of image-producing beams of light and optical means for forming a pseudo-stereoscopic pair of image-producing beams of light, and comprising prism moving means and one, and only one, measuring prism serving the two pseudo-stereoscopic beams, being placed in the paths of the two pseudo-stereoscopic beams at a position where they proceed side by side and being movable angularly therein by actuation from said prism moving means, for effecting range measurement involving equal vertical movements of the two pseudo-stereoscopic images, one in each field.

JAMES WEIR FRENCH.